United States Patent [19]
Meyers

[11] Patent Number: 5,715,096
[45] Date of Patent: Feb. 3, 1998

[54] ZOOM LENS

[75] Inventor: Mark Marshall Meyers, Hamlin, N.Y.

[73] Assignee: Eastman Kodak Company, Rochester, N.Y.

[21] Appl. No.: 661,537

[22] Filed: Jun. 11, 1996

[51] Int. Cl.$^6$ ............................................. G02B 15/14
[52] U.S. Cl. ........................... 359/689; 359/791; 359/714
[58] Field of Search ........................... 359/689, 745, 359/746, 763, 767, 791, 714

[56] References Cited

U.S. PATENT DOCUMENTS

| | | | |
|---|---|---|---|
| 5,069,536 | 12/1991 | Ogata | 359/689 |
| 5,148,321 | 9/1992 | Goto et al. | 359/689 |
| 5,325,235 | 6/1994 | Takashima et al. | 359/689 |
| 5,327,290 | 7/1994 | Fukushima et al. | 359/692 |
| 5,379,154 | 1/1995 | Shibayama et al. | 359/689 |
| 5,424,870 | 6/1995 | Hashimura et al. | 359/689 |
| 5,434,711 | 7/1995 | Tetsuya et al. | 359/689 |

*Primary Examiner*—Hoa Q. Pham
*Attorney, Agent, or Firm*—Svetlana Z. Short

[57] ABSTRACT

A compact zoom lens with three movable lens units of positive, positive and negative optical powers, respectfully. During zooming, the axial distance between the first and the rear lens units changes less than the axial distance between the first lens unit and the middle lens unit; the middle lens unit is movable towards the object side at a relatively slower axial speed than that at which the first and third lens units are moved.

9 Claims, 19 Drawing Sheets

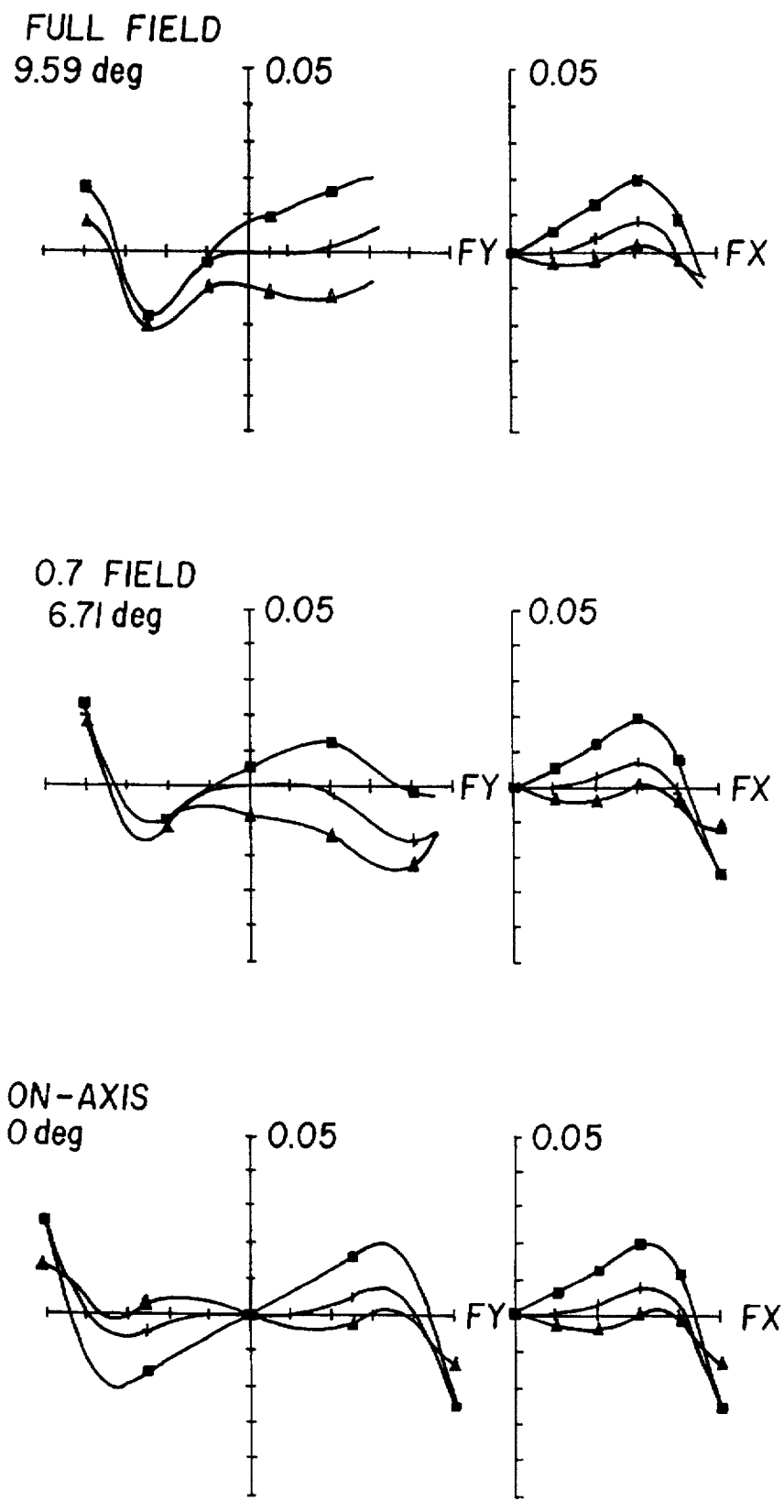

ZOOM LENS

BACKGROUND OF THE INVENTION

1. Field of the Invention

This invention relates to compact zoom lenses having a small number of lens elements, and more particularly to zoom lenses which are suited for use as an objective lens, also referred to as a taking lens, in photographic cameras, video cameras, electronic cameras, or the like.

2. Description of the Prior Art

Zoom lenses generally are formed of a plurality of lens units of one or more lens elements each. It has been known to make three-unit zoom lenses with a positive front lens unit, a positive middle lens unit, and a negative rear lens unit. However, because of the desire to expand zoom range while reducing the size, weight and costs of cameras with zoom lenses, efforts are being made to create compact zoom lenses (also referred to as zoom lens systems) having a larger focal length ratio and a small number of lens elements.

More specifically, a zoom lens must maintain high image quality in each zoom position and retain a flat field over a range of field angles. In addition, it is desirable to have a large zoom range while having a minimum front vertex to image plane distance in the telephoto position. This provides a small package size and decreases the overall lens system volume. It is also desirable to have a minimal number of lens elements in order to decrease the manufacturing costs. However, the requirement to produce a compact zoom lens system with a minimum number of lens elements often conflicts with the requirement to produce high quality images over a very large zoom ratio.

The following four U.S. patents all describe zoom lens systems which have three lens units of positive, positive and negative optical power, respectfully. All four of these patents disclose that the aperture stop is located with the middle lens unit (i.e. the aperture stop moves integrally with the middle lens unit).

U.S. Pat. No. 5,424,870, issued Jun. 13, 1995, discloses a zoom lens system with three lens units of positive, positive and negative optical powers, respectfully. An aperture stop is located in the back of the middle lens unit. The three lens units move independently of each. The fifth embodiment discloses a lens system with only 5 lens elements. However, although this lens has 4 aspheric surfaces, the total zoom ratio is only 1.9. The zoom ratio ZR is measured by the ratio of lens system's focal lengths, i.e. $ZR=f_t/f_w$, where $f_w$ is the focal length of the zoom lens in the wide-angle mode and $f_t$ is the focal length of the zoom lens in the telephoto mode. The 11th embodiment of this reference achieves a zoom ratio of 2.8. This embodiment has 6 lens elements and 7 aspheric surfaces. In addition, all lens elements are uncemented, which means that all of them have to be aligned with respect to one another during assembly. The twelfth embodiment achieves a 2.8 zoom ratio with 8 lens elements and a total of 6 aspheric surfaces. The thirteenth embodiment achieves the 2.8 zoom ratio with 8 lens elements. It has 5 aspheric surfaces.

U.S. Pat. No. 5,327,290, issued Jul. 5, 1994 discloses a zoom lens system (embodiments 19, 20 and 23–24) of four to five lens elements each and 4 to 5 aspheric surfaces. The lens elements are arranged into main moving groups or units. The first unit has positive optical power and includes two positive power subgroups that move with respect to one another for aberration correcting purposes. The aperture stop is located in the rear of the second sub-group. In all of these embodiments the elements are all airspaced singlets. All of these embodiments have a zoom ratio of only 2.2.

U.S. Pat. No. 5,434,711, issued Jul. 18, 1995 discloses a zoom lens system of four to five lens elements each and 4 to 5 aspheric surfaces. The lens elements are arranged into 3 moving groups. All of these embodiments have a zoom ratio of 2.6.

U.S. Pat. No. 5,148,321, issued Sep. 15, 1992 discloses a zoom lens system of seven to nine lens elements each and 1–2 aspheric surfaces. The lens elements are arranged into 3 moving groups with the front and the rear group locked together. Each of these embodiments have a zoom ratio about 2.

Other examples of prior art also provide a three unit lens system, but they are either have a substantially greater number of lens elements than the U.S. patents described above, or have a substantially smaller zoom ratio.

SUMMARY OF THE INVENTION

An object of the present invention is to provide a zoom lens which offers superior optical performance and a zoom ratio which is equal to or larger than 3.

The zoom lens according to the present invention comprises a plurality of lens elements centered on an optical axis and arranged into three lens units. More specifically, there is a first lens unit of positive power comprising a positive lens element and a negative lens element, a middle lens unit of positive power, and a rear lens unit of negative power. During zooming an axial distance between the first and the rear lens units changes less than an axial distance between the first lens unit the middle lens unit. The middle lens unit is movable towards the object side at a slower speed than the speed at which the front and lens units move.

According to a preferred embodiment of the present invention, an aperture stop moves with the first lens unit.

With the preferred embodiment of the invention, the following and other advantages are realized: It is an advantage of the zoom lens of the present invention that it provides superior image quality and has a zoom ratio of 3 or higher with as few as 5 lens elements and with 5 or fewer aspheric surfaces.

BRIEF DESCRIPTION OF THE DRAWINGS

FIG. 1A is a sectional view of the lens system 100 in a telephoto (T) position. FIG. 1B shows a sectional view of the zoom lens 100 in the intermediate position (M). FIG. 1C is a sectional view of the zoom lens 100 in a wide-angle (W) position;

FIG. 3A is a sectional view of the zoom lens 200 in a telephoto (T) position. FIG. 3B is a sectional view of the zoom lens 200 in a middle (M) position. FIG. 3C is a sectional view of the zoom lens 200 in a wide-angle (W) position;

FIG. 5A is a sectional view of the zoom lens 300 in a telephoto (T) position. FIG. 5B is a sectional view of the zoom lens 300 in a middle (M) position. FIG. 5C is a sectional view of the zoom lens 300 in a wide-angle (W) position;

FIGS. 6A–6F are graphical representations of the aberrations of the zoom lens 300 illustrated in FIG. 5A–5C;

DESCRIPTION OF THE PREFERRED EMBODIMENT

The embodiments of the invention illustrated by three examples are shown respectively in FIGS. 1A–1C, 3A–3C, and 5A–5C and are set fourth in Tables 1A–1C, 2A–2C and 3A–3C, respectively. In the tables and the drawings, the surfaces have radii R which are numbered by subscripts from the front, also referred to as the object side, of the lens to the rear or image side of the lens. The distances along an optical axis OA corresponding to the thicknesses T of the lens elements or the spacings S between the lens components are also numbered from front to rear. For example, $S_1$ corresponds to the first air space, $S_2$ to the second air space, $S_3$ to the third air space, and $S_4$ to the fourth airspace. In the tables, spaces and thicknesses are listed on the same line as the surface preceding the space or thickness, as the case may be. All indices $N_e$ are for the mercury e line of the spectrum at a wavelength $\lambda_e$ of 546.1 nm. The symbol V stands for the abbe number for the lens material. The thickness and the spacings provided in the tables are in millimeters.

Description Of Lens Unit Configuration

Figure 1A:
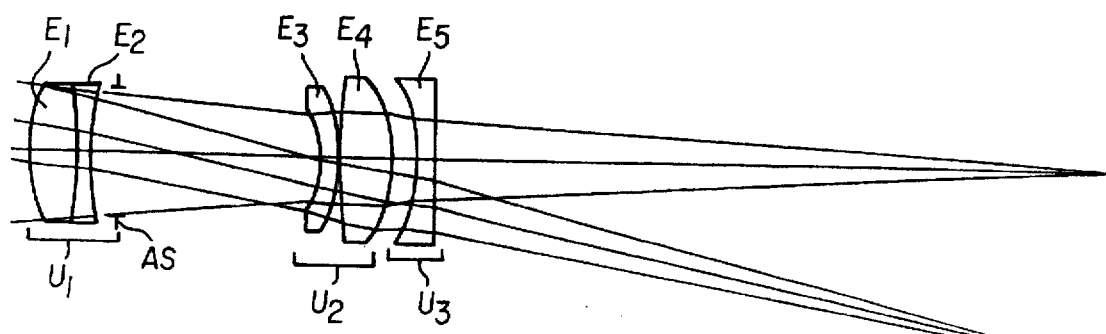
FIGS. 1A–1C show a sectional view of a zoom lens 100 of a first illustrative embodiment.
Figure 1B:
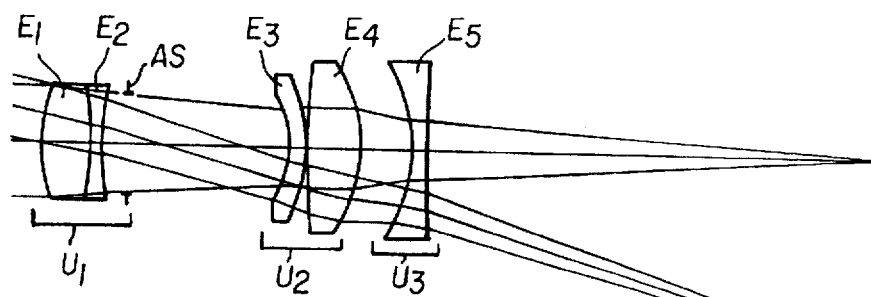
Figure 1C:
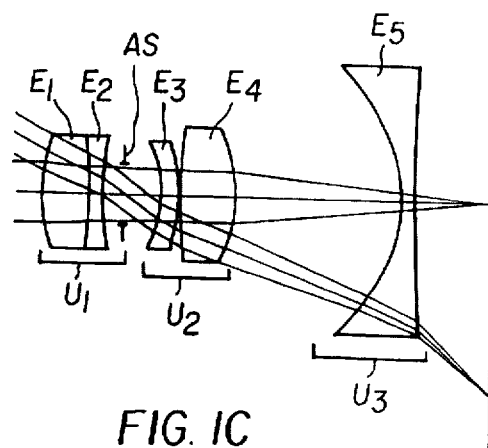

In the present invention, a zoom lens includes three axially movable lens units $U_1$, $U_2$ and $U_3$. Lens units $U_1$, $U_2$ and $U_3$ move relatively to each other during zooming. Their relative movements are shown in FIG. 1A–1C. More specifically, the space $S_2$ between the first lens unit $U_1$ and the middle lens unit $U_2$ widens while the space $S_4$ between the middle lens unit $U_2$ and the rear lens unit $U_3$ narrows as the three lens units move toward the object side (along an optical axis) when the zoom lens system zooms from a wide-angle position (W) towards a telephoto position (T). In addition, during the zooming movements, the axial distance between the first lens unit $U_1$ and the rear lens unit $U_3$ changes less than the axial distance between the first lens unit $U_1$ and the middle lens unit $U_2$. That is, as the focal length of the zoom lens increases, and as the space between the image plane and the rear zooming lens unit $U_3$ increases, the distance between the first lens unit $U_1$ and the rear lens unit $U_3$ varies by a relatively small amount. Meanwhile the middle lens unit $U_2$ moves from being relatively close to the first zooming lens unit $U_1$ to being relatively close to the rear lens unit $U_3$.

It is preferred that the change $\Delta_{f-r}$ in the axial distance between the front lens unit and the rear lens unit be between 10% and 30% of the change $\Delta_{f-m}$ in the axial distance between the front lens unit and the middle lens unit (i.e., $0.10 < \Delta_{f-r}/\Delta_{f-m} < 0.30$). It is even more preferred that the change $\Delta_{f-r}$ in the axial distance between the front lens unit $U_1$ and the rear lens unit $U_3$ be between 15% and 20% of the change $\Delta_{f-m}$ in the axial distance between the front lens unit $U_1$ and the middle lens unit $U_2$. If the ratio $\Delta_{f-r}/\Delta_{f-m}$ becomes less than 0.1, it becomes hard to maintain the zoom ratio above 3. If the ratio $\Delta_{f-r}/\Delta_{f-m}$ becomes higher than 0.3, aberration correction becomes difficult and the lens system becomes less compact. All of the embodiments provide a zoom ratio greater than 3.

Figure 7A:
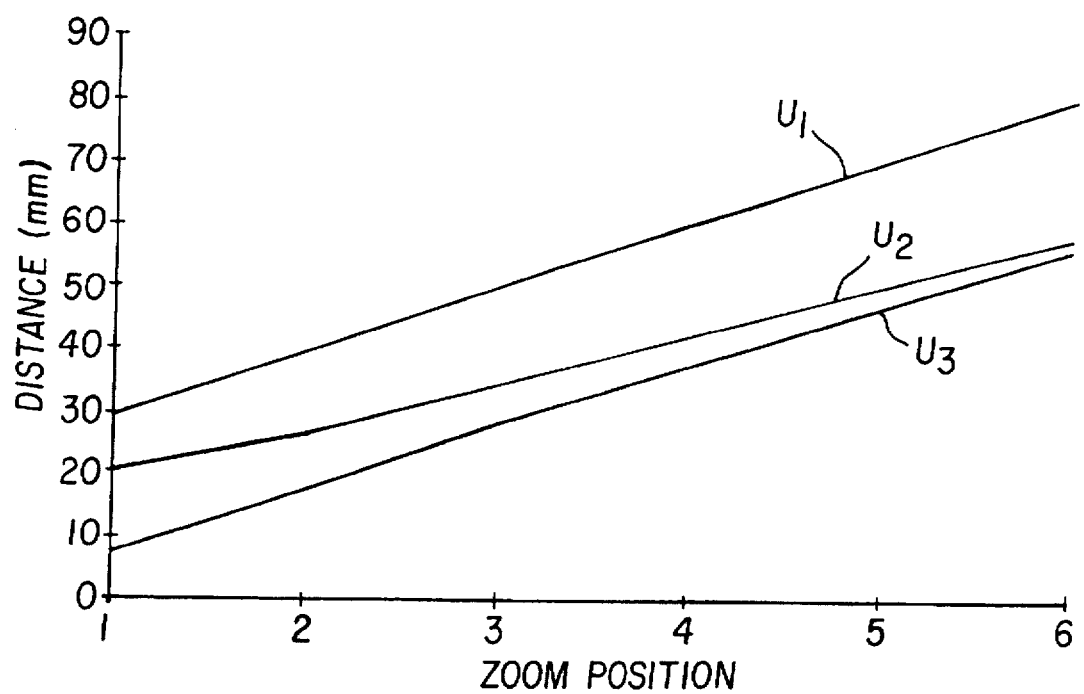
FIGS. 7A–7B tabulate relative movements of lens units of zoom lens 100 with respect to one another.
Figure 7B:
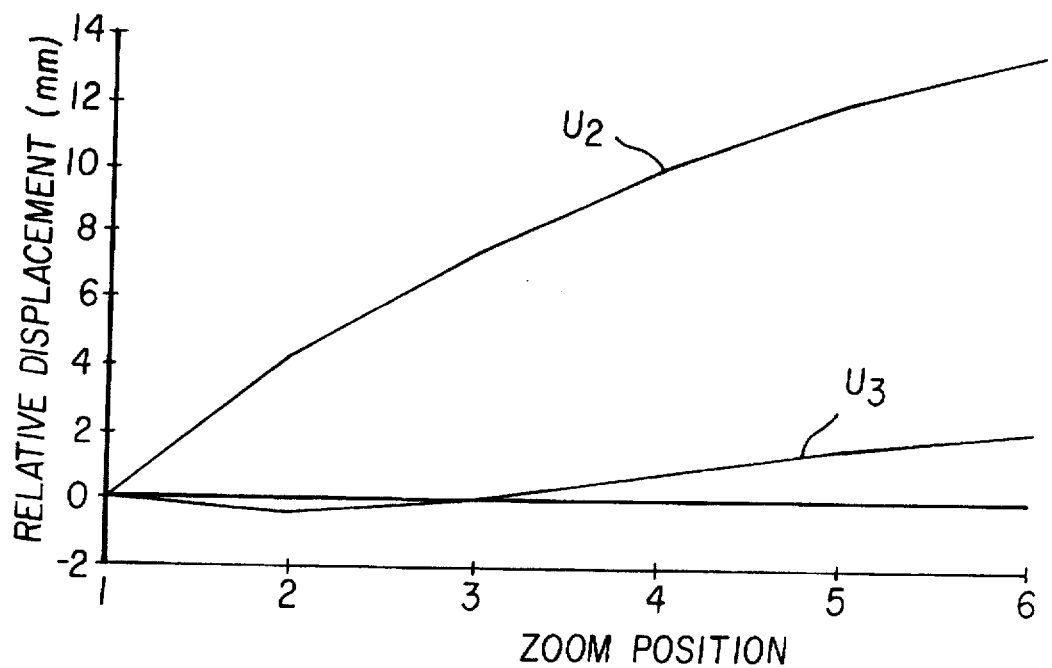
Figure 7C:
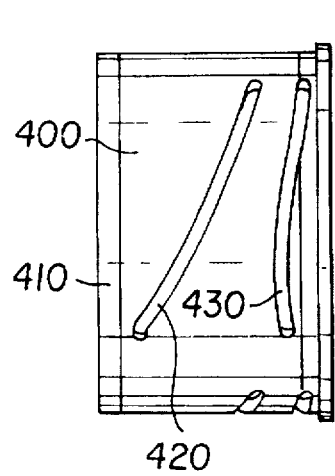
FIG. 7C–7D show a portion of a cam mechanism for moving lens units relative to one another.
Figure 7D:
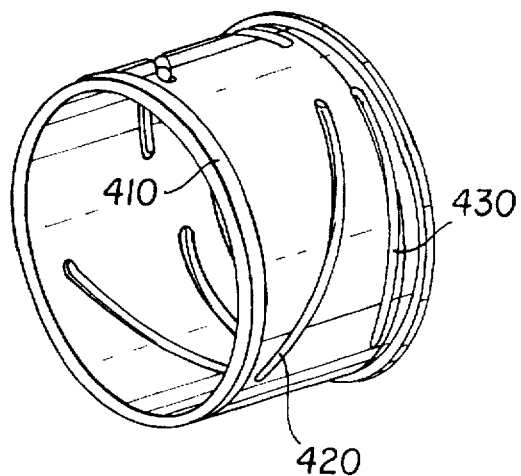

The precise movements of the three lens units relative to one another can be achieved by a cam mechanism or by use of independently operating motors which control the movement of the individual the zooming lens units. The relative movements of the lens units $U_1$, $U_2$, $U_3$ (for the zoom lens 100) with respect to one another as these units zoom from the telephoto (T) position towards the wide angle (W) position are shown in FIG. 1A–C. FIG. 7A is a graph of a relative displacement of lens units $U_2$ and $U_3$ with respect to the first lens unit $U_1$ in the wide angle mode. FIG. 7B is a graph of a relative displacement of lens units $U_1$, $U_2$ and $U_3$ with respect to the image plane. A cam sleeve 400 for accomplishing these movements is shown in FIG. 7C. The cam sleeve 400 has a plurality of groves 420 and 430. The first lens unit $U_1$ is rigidly attached to the front 410 of the cam sleeve 400. When the cam sleeve 400 moves forward, the first lens unit $U_1$ moves forward too. The movement of the rear unit $U_3$ is determined by the grove 430. As can be seen from the shape of this groove, the rear unit $U_3$ moves relatively little with respect to the first unit $U_1$. The movement of the rear unit $U_2$ is determined by the grove 420.

According to the illustrative embodiments, the front lens unit $U_1$ is an achromatized, positive power doublet. The focal length $FL_1$ of the first lens unit $U_1$ is about 70 to 80 mm and its power $\phi_1$ is about $1.2\times10^{-2}$ to $1.4\times10^{-2}$ mm$^{-1}$. It is preferable for this doublet to be a cemented doublet with a positive power lens element $E_1$ located in front (i.e., towards the object side) and a negative power lens element $E_2$ located behind lens element $E_1$. Using a cemented doublet makes for simplified mounting and alignment of the front lens unit $U_1$ with respect to other lens units. This simplification occurs because it is easier to center two lens elements which are cemented together before they are mounted in a lens barrel, than it is to center two airspaced lens elements in the lens barrel.

Using a positive power front lens element $E_1$ allows the light rays to be bent towards focus (i.e., to converge) at the first surface, whereas a negative power front lens element actually causes the light rays to diverge. Thus, the lens system with the positive power front lens element $E_1$ can be more compact (i.e., shorter) than a similar lens system with a negative power front lens element. Additionally, the lens system with a positive power front lens element can use lens elements with smaller clear aperture diameters in the front lens unit. Having a positive power frontmost lens element $E_1$ also helps to achieve a better telephoto ratio. Finally, the positive front unit $U_1$, where the front lens element $E_1$ is positive, produces lower overall astigmatism, flatter field curves (lower petzval curvature) and generates less image plane distortion over the zooming range than similar zoom lenses with a negative power front lens element in the front lens unit.

According to the illustrative embodiments, the middle lens unit $U_2$ is located behind the front lens unit $U_1$. The middle lens unit $U_2$ is also positive (i.e. it has positive refractive power). It contains two very slightly airspaced lens elements (a meniscus lens element $E_3$ and a biconvex lens element $E_4$). The focal length $FL_2$ of the second lens unit $U_2$ is about 20 to 25 millimeters and its power $\phi_2$ is about $4.0\times10^{-2}$ mm$^{-1}$ to $5.0\times10^{-2}$ mm$^{-1}$.

The rear optical unit $U_3$ is substantially negative in power. Its focal length is about −20.86 millimeters and its power $\phi_3$ is about $-4.79\times10^{-2}$ mm$^{-1}$. The rear optical unit $U_3$ contains a relatively strong negative power lens element $E_5$ with a concave object side surface having a radius of curvature $R_8$. It is preferred that the absolute value of the ratio of lens unit powers $\phi_3$ to $\phi_2$ is approximately 1. The object side surface of lens element $E_5$ has a smaller radius of curvature then that of the image side surface. This object side surface is strongly aspheric in the vicinity of the clear aperture. The use of a strong negative lens element $E_5$ with an aspheric surface in the rear lens unit allows for the zoom lens to have a very effective field flattener when the lens system is in wide-angle position and provides for a high level of aberration correction in the telephoto position.

Aperture Stop

The aperture stop AS is in the form of a shutter which is positioned with the front lens unit $U_1$. That is, the shutter moves together with the front lens unit $U_1$. This positioning of the aperture stop AS is advantageous because it facilitates correction of aberrations of the lens, especially at its telephoto position. The placement of the aperture stop AS with the front lens unit $U_1$ helps to provide a relatively large numerical aperture at the long focal length position (i.e., telephoto position).

Stop shifted aberrations, which are always present in zoom lens systems to some extent, and which are described in Smith, *Modern Optical Engineering*, published by McGraw-Hill, Inc., tend to vary more if the distance between the aperture stop and the front zoom lens unit varies. Thus, placing the aperture stop AS with the front lens unit $U_1$ allows better control of aberrations such as distortion through the stop shift equation. That is, moving the aperture stop AS relative to the front lens unit $U_1$ (i.e. the first zooming unit) causes the distortion to change with zoom position. On the other hand, we found that placing the aperture stop AS with the front lens unit $U_1$ significantly improved distortion correction.

The location of the aperture stop AS behind the lens elements of the front lens unit $U_1$ also allows better control of astigmatism as a function of zoom position, because highly aberrated rays in the wide-angle position can more easily be vignetted out of the image forming bundle.

In addition, the placement of the aperture stop with the front lens unit $U_1$ reduces the size of the first lens unit $U_1$, which simplifies mounting and reduces the size of the telescoping zoom lens barrel.

Aspheric Surfaces

The lens systems 100, 200 and 300 have at least four aspheric surfaces. At least one aspheric surface is present in each zooming lens unit. The aspheric equation describing these aspheric surfaces is:

$$X = \frac{CY^2}{1 + \sqrt{1 - (K+1)C^2Y^2}} + ADY^4 + AEY^6 + AFY^8 +$$

$$AGY^{10} + AHY^{12} + AIY^{14} + AJY^{16} + AKY^{18}$$

where:

X is the distance along the optical axis OA;

Y is the height from the optical axis;

C is the reciprocal of the vertex radius of curvature of the curved lens surface;

K is the conic coefficient; and

AD through AK are aspheric coefficients of 4th, 6th, 8th, 10th, 12th, 14th, 16th, and 18th order. The values of the aspheric coefficients for the various aspheric lens surfaces for the two lens embodiments are provided in Tables 1B and 2B.

More specifically, in lens systems 100 and 200, the aspheric surfaces are located on the surfaces with radii $R_1$, $R_5$, $R_7$ and $R_8$ associated with lens elements $E_1$, $E_3$, $E_4$ and $E_5$, respectively. Lens system 300 has its aspheric surfaces located on surfaces with radii $R_1$, $R_3$, $R_6$, $R_8$ and $R_9$, associated with lens elements $E_1$, $E_2$, $E_3$, $E_4$ and $E_5$, respectively. The use of the above mentioned aspheric provides several advantages. First, it helps to minimize the number of lens elements in the lens system.

Secondly, having no more than one aspheric surface per lens element avoids the use of biaspheric lens elements. Lens systems which utilize biaspheric elements tend to be sensitive to alignment, especially tilt and decentration of one lens surface to the other and to the displacement of a lens element from the optical axis. The low sensitivity of the present lens system results in a zoom lens system that is easier and less expensive to manufacture and assemble than a typical zoom lens system of comparable performance.

Thirdly, in addition to decreasing the number of lens elements in the lens system, aspheric surfaces significantly increase the resultant image quality. The resulting image quality of lens systems 100, 200 and 300 is very high given the relatively small number of elements, the large zoom ratio, and the overall compactness of the lens.

For example, zoom lens system 100 of the first illustrative embodiment has a maximum amount of astigmatism 0.3 and only 0.2% distortion in the wide-angle position, while in the telephoto position, the amount of astigmatism is less than 0.4 millimeters and the maximum distortion amount is less than 1%. Similarly, zoom lens system 200 of the second illustrative embodiment has only 0.4 millimeters astigmatism and 1% distortion in the wide-angle position while in the telephoto position, the amount of astigmatism is 0.3 millimeters and the distortion is only 0.2%.

Figure 8:
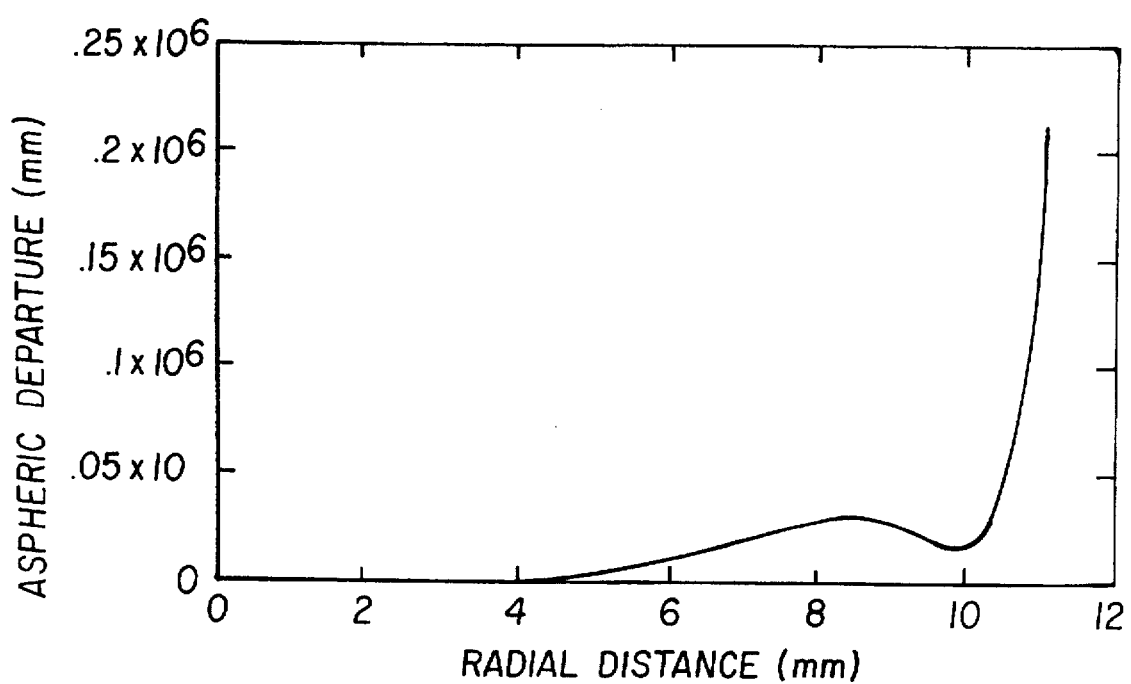
FIG. 8 depicts an aspheric deformation relative to a spherical surface of the rear lens element of the lens system 100.

More specifically, the aspheric surface on the rear lens element $E_5$ has a strong conic contribution described by a conic coefficient K. This conic contribution controls field dependent aberrations such as Coma, Astigmatism and Petzval curvature. The use of an aspheric surface on a strong negative rear element $E_5$ allows field aberrations encountered at different zooming positions to be addressed with different segments of the lens aperture. This allows the use of higher order aspheric terms to compensate for field aberrations at the wide-angle zoom positions while the lower order aspheric terms are used primarily in the telephoto mode. It is noted the amount of asphericity on the object side surface of the rear lens element $E_5$ is about or greater than 50,000 nm in the vicinity of its clear aperture. FIG. 8 depicts an aspheric deformation relative to a spherical surface of the rear lens element of the lens system. The vertical axis shows the amount of aspheric departure (in millimeters) and the horizontal axis is the radial distance in millimeters from the center of the lens element. The aspheric surface profile is similar to those of other embodiments.

The compact zoom lens 100 utilizes low cost glasses. The zoom lens 200 utilizes low cost glasses, as well as a plastic lens element (lens element $E_3$) to minimize the cost of the lens system. The plastic element $E_3$ is chosen to be an element with relatively low power so that the environmental effects on the refractive index, surface radii and thickness of the plastic element will not greatly degrade the lens system performance over a wide range of temperature and humidity.

Figure 2A:
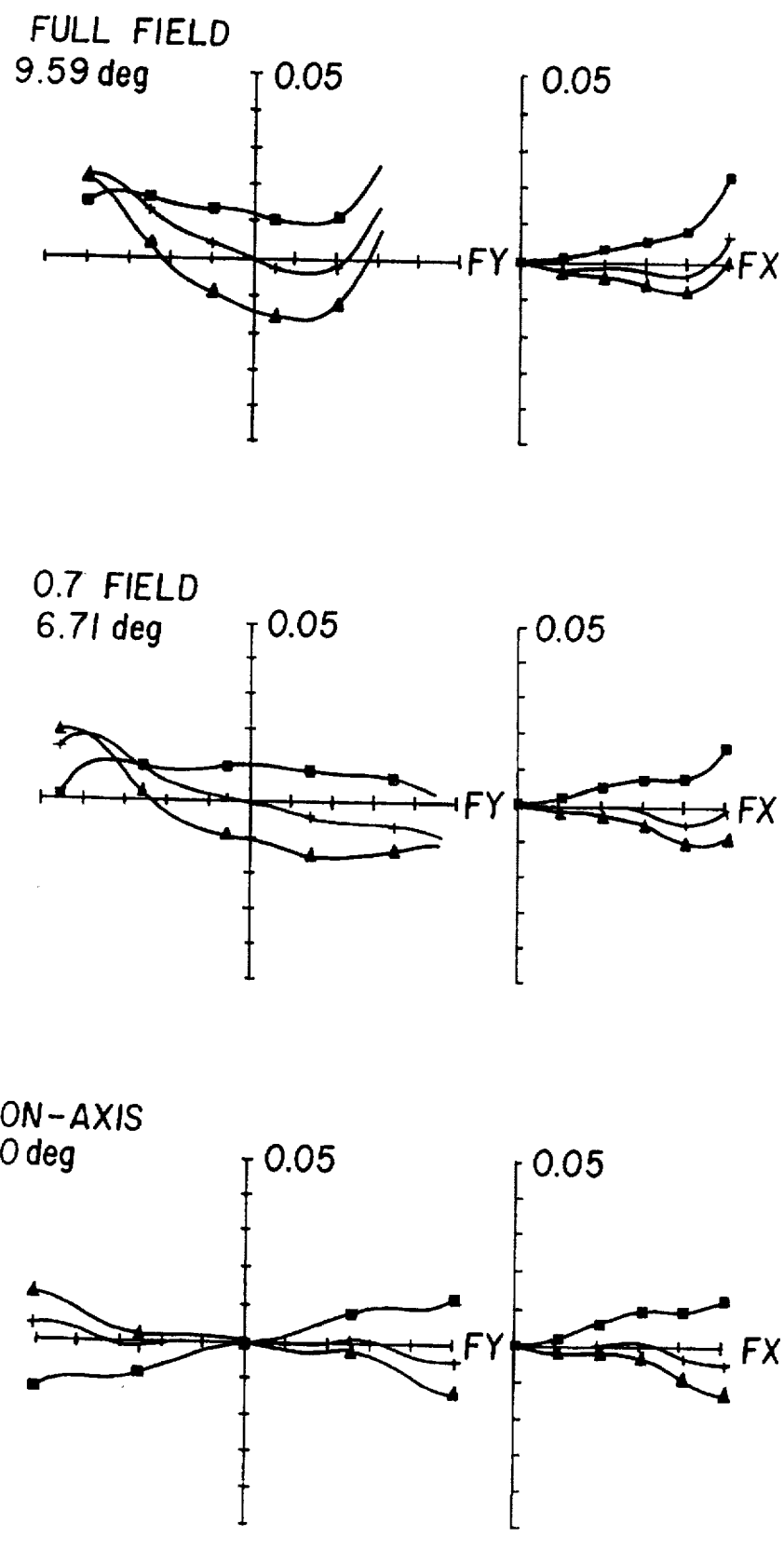
FIGS. 2A–2F are graphical representations of the aberrations of the lens system 100 illustrated in FIGS. 1A–1C.
Figure 2B:
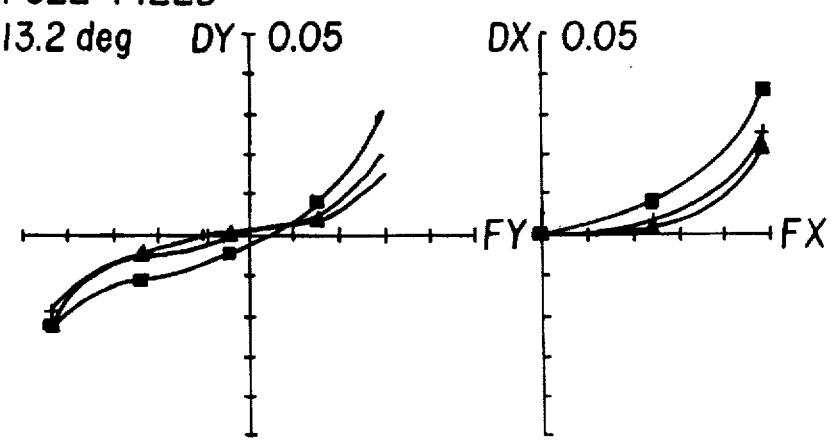
Figure 2B:
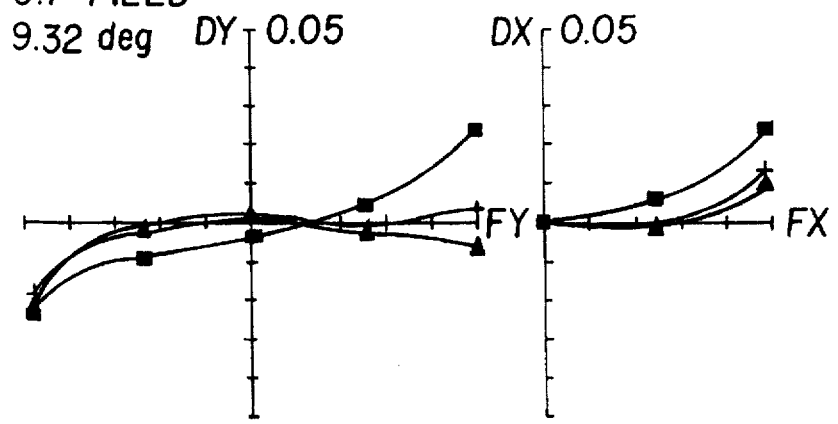
Figure 2B:
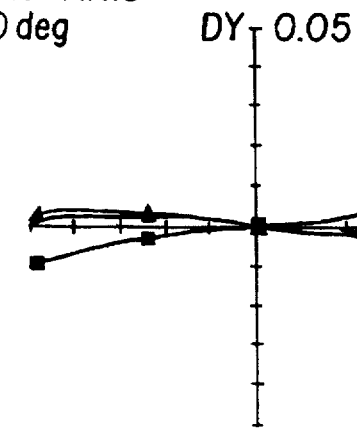
Figure 2C:
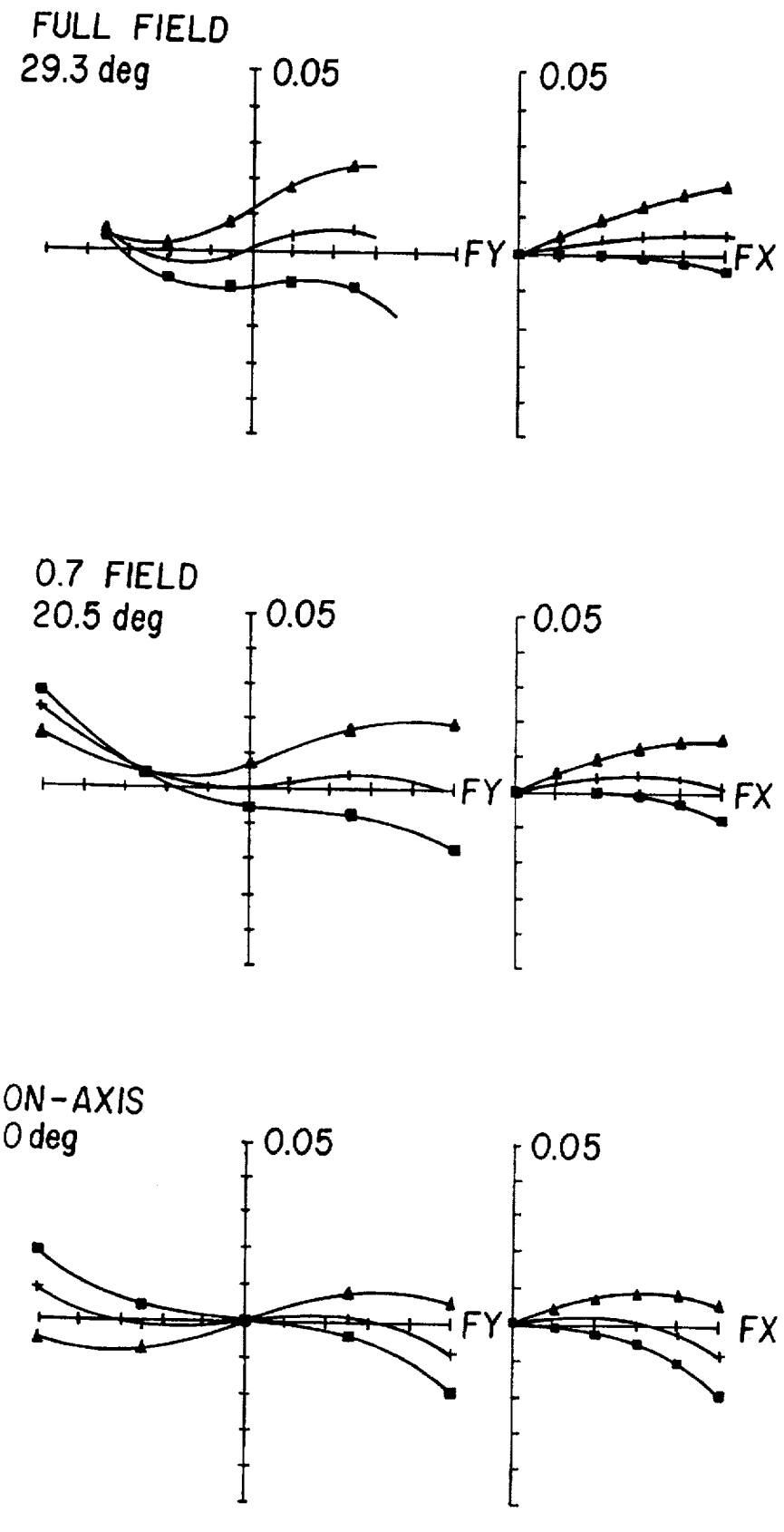
Figure 2D:
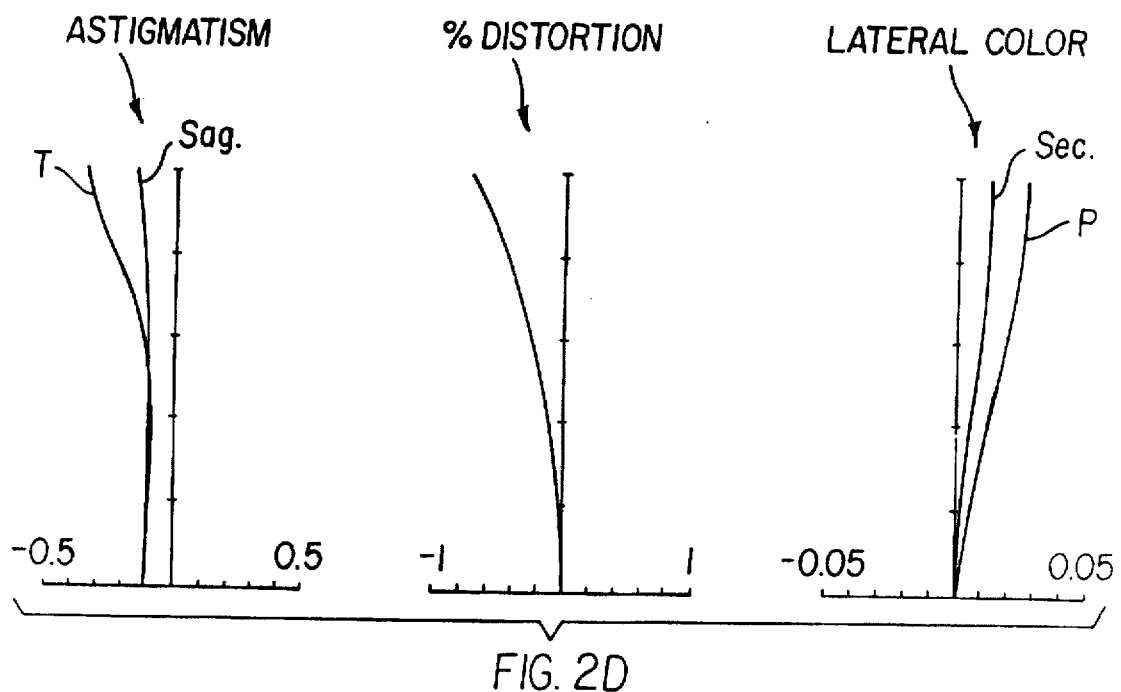
Figure 2E:
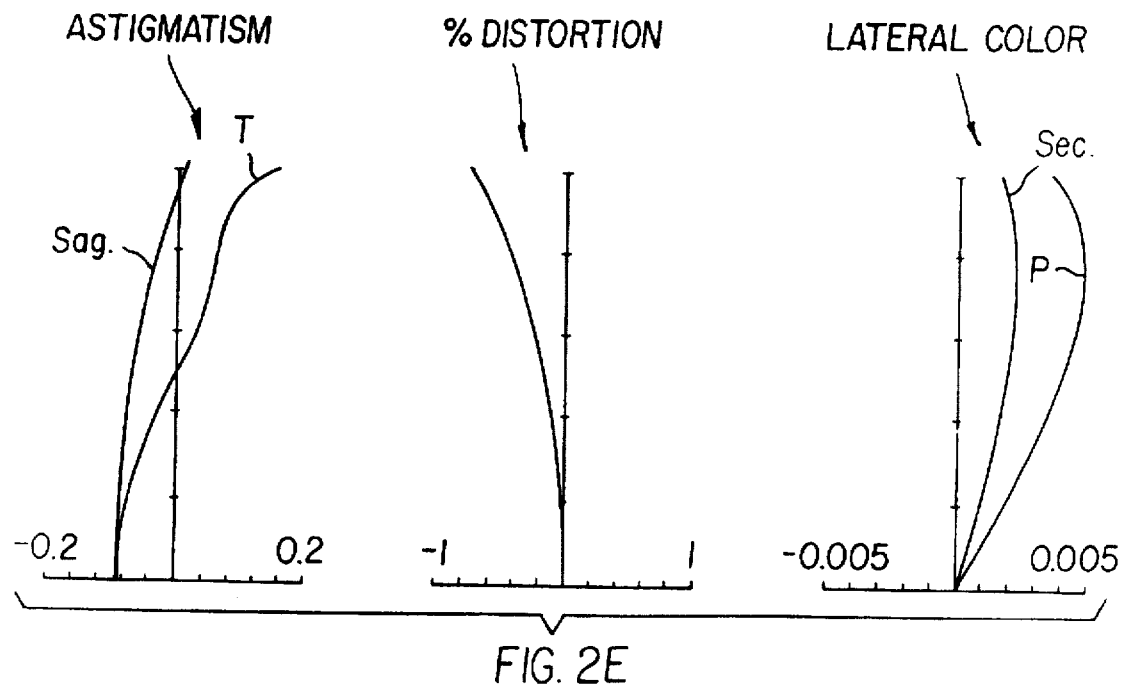
Figure 2F:
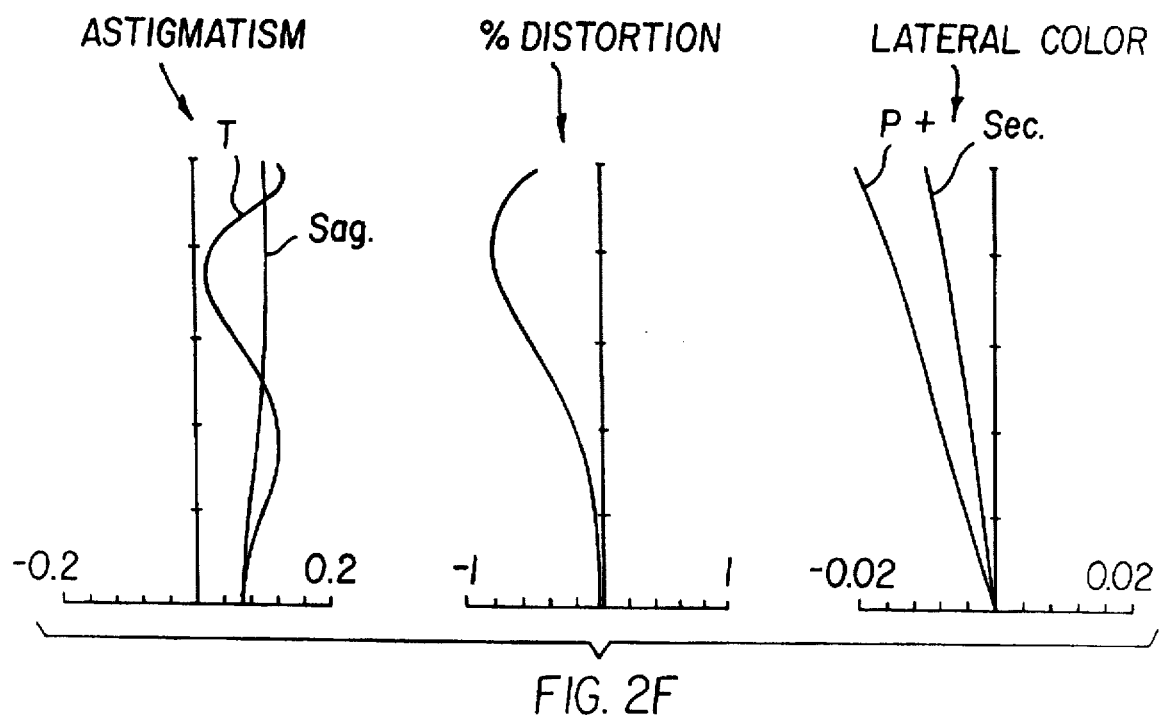
Figure 3A:
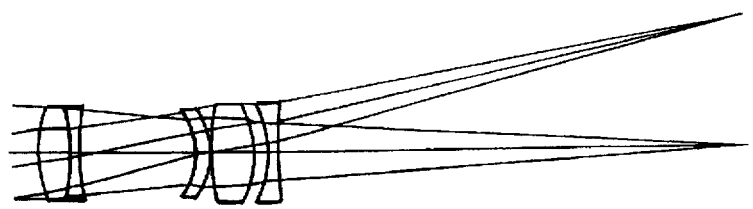
FIGS. 3A–3C are sectional views of a zoom lens 200 of a second illustrative embodiment.
Figure 3B:
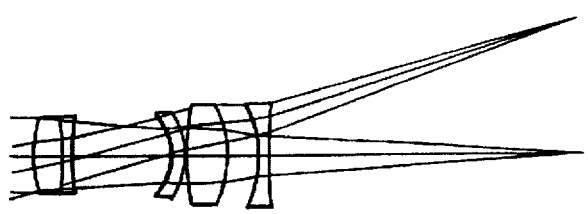
Figure 3C:
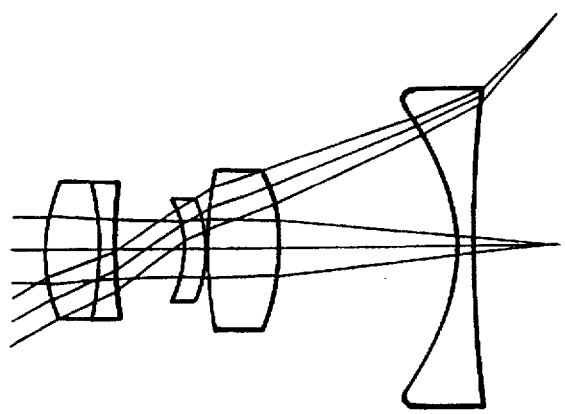

FIGS. 2A–2F, 4A–4F and 6A–F detail the performance of zoom lenses 100, 200 and 300 at wide-angle, mid-zoom and telephoto positions. Included are ray traces for the various field positions, field curvature, distortion and lateral color plots. More specifically, FIG. 2A provides ray intercept plots for the zoom lens 100 when it is operating in the telephoto position at 0, 0.7, and full field of view, respectfully. FIG. 2B provides ray intercept plots for the zoom lens 100 when it is operating in the middle position at 0, 0.7, and full field of view. FIG. 2C provides ray intercept plots for the zoom lens 100 when the lens system is operating at the wide-angle position. FIGS. 2D–2F represent Astigmatism, Distortion and Lateral color when the zoom lens 100 is operating in the telephoto, middle and wide-angle position, respectfully.

Figure 4D:
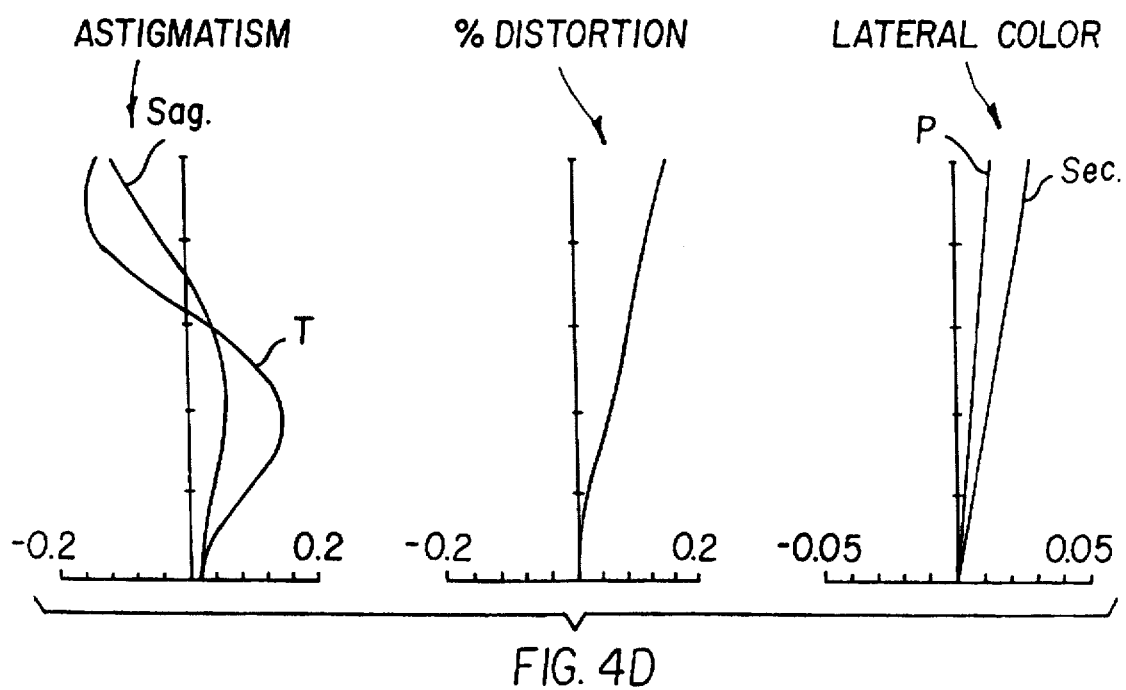
FIGS. 4A–4F are graphical representations of the aberrations of the lens system 200 illustrated in FIGS. 3A–3C.
Figure 4A:
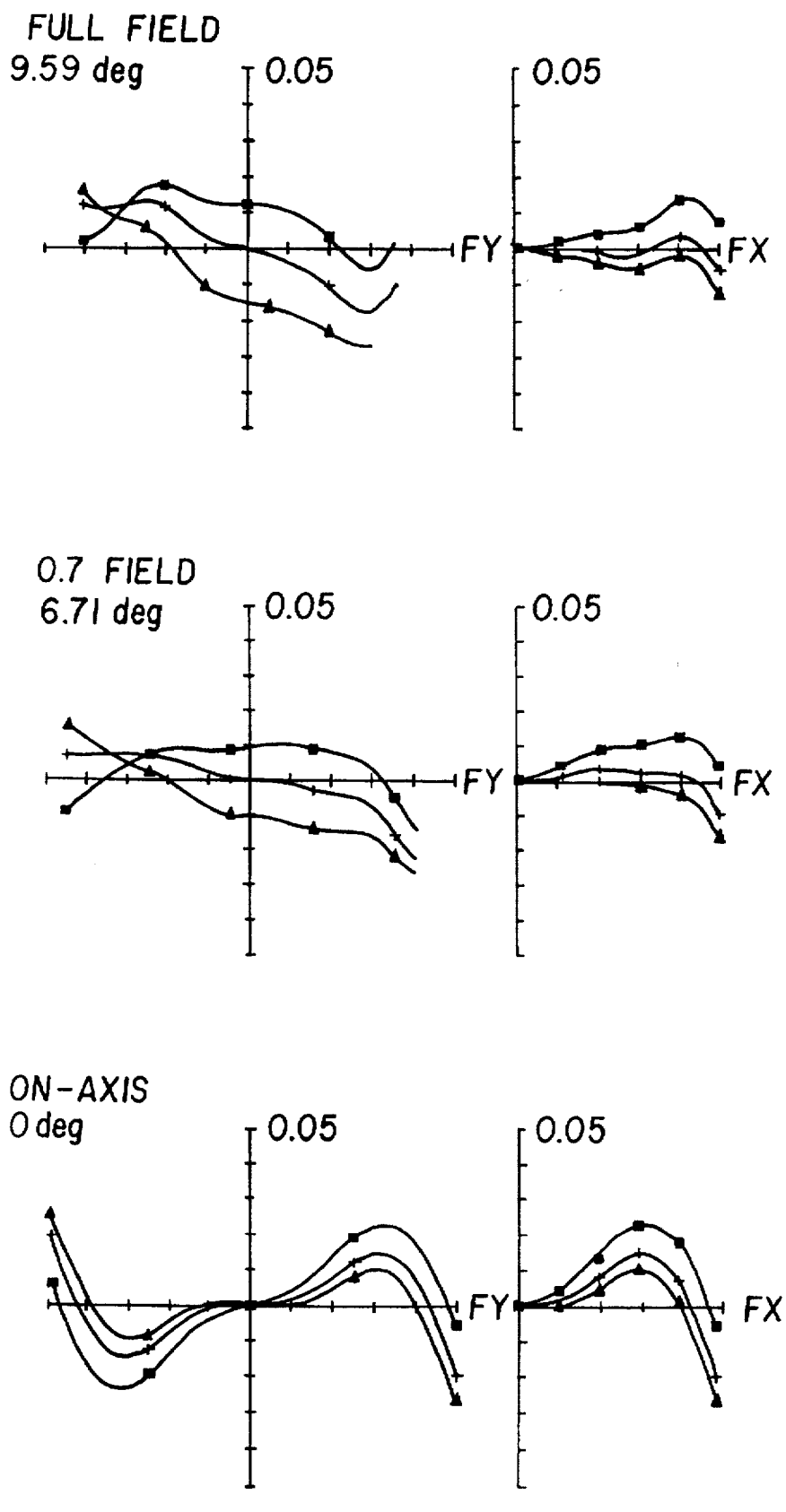
Figure 4B:
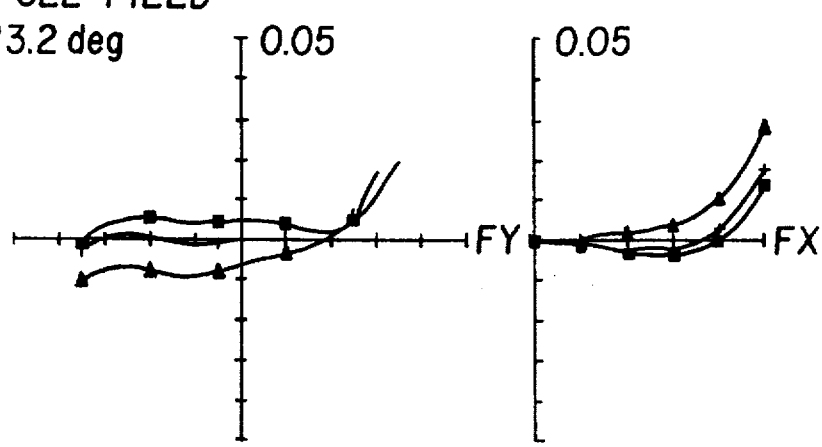
Figure 4B:
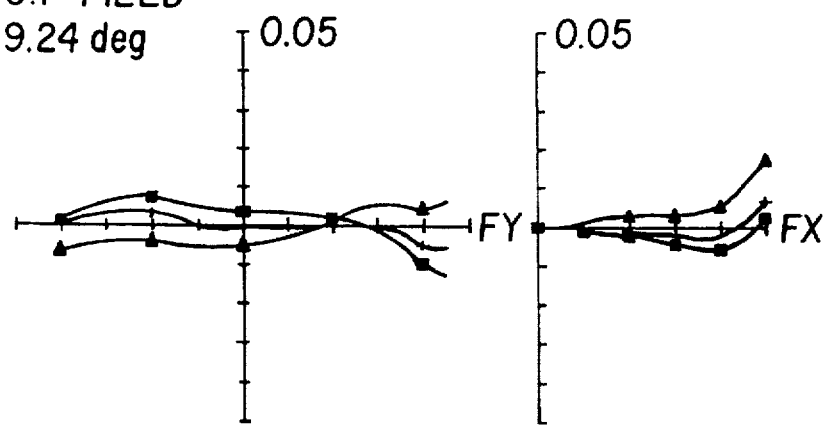
Figure 4B:
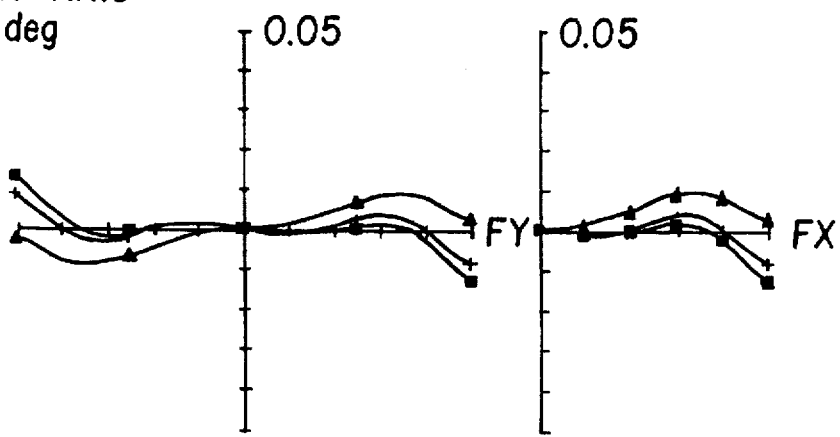
Figure 4C:
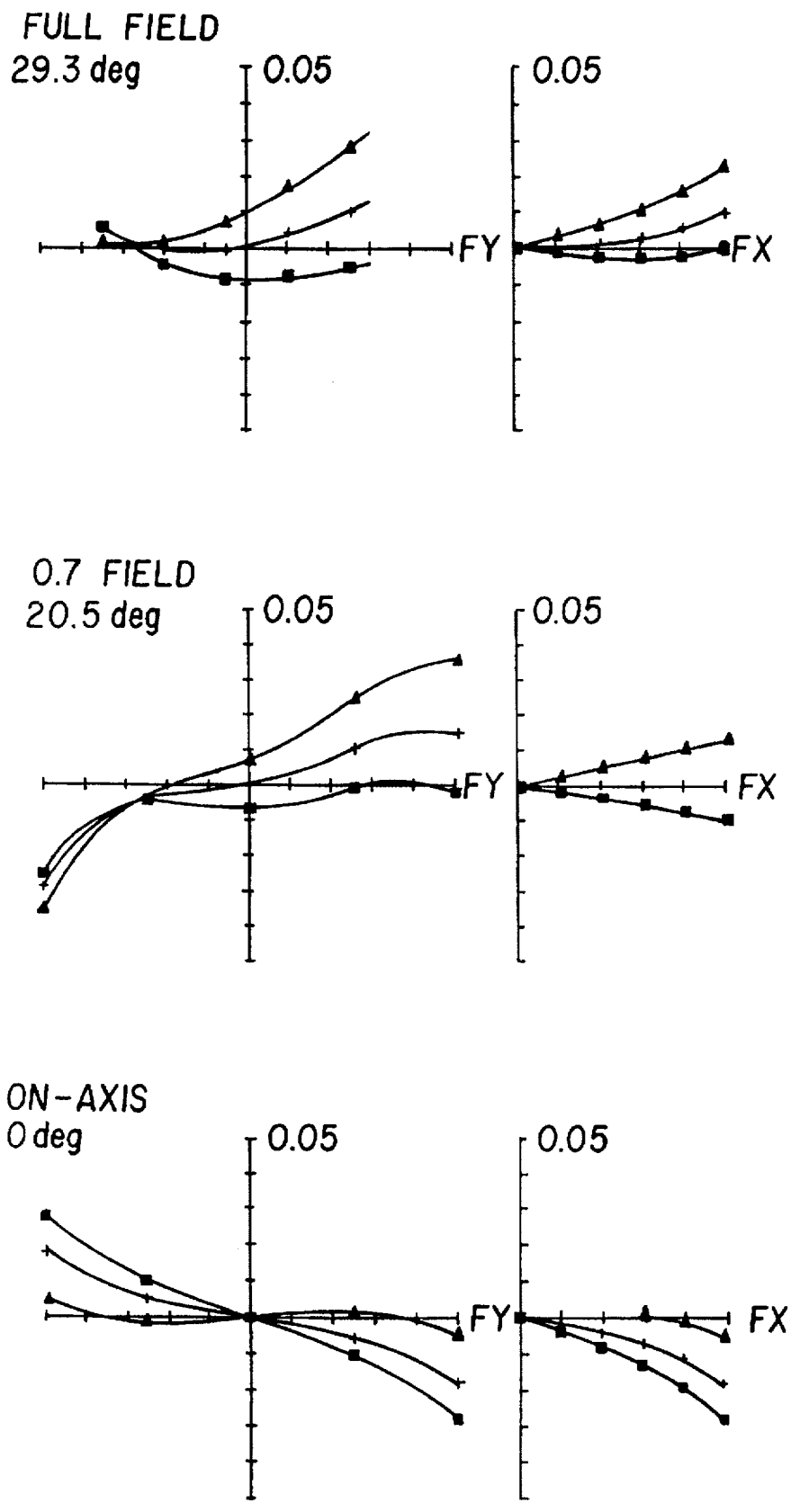
Figure 4E:
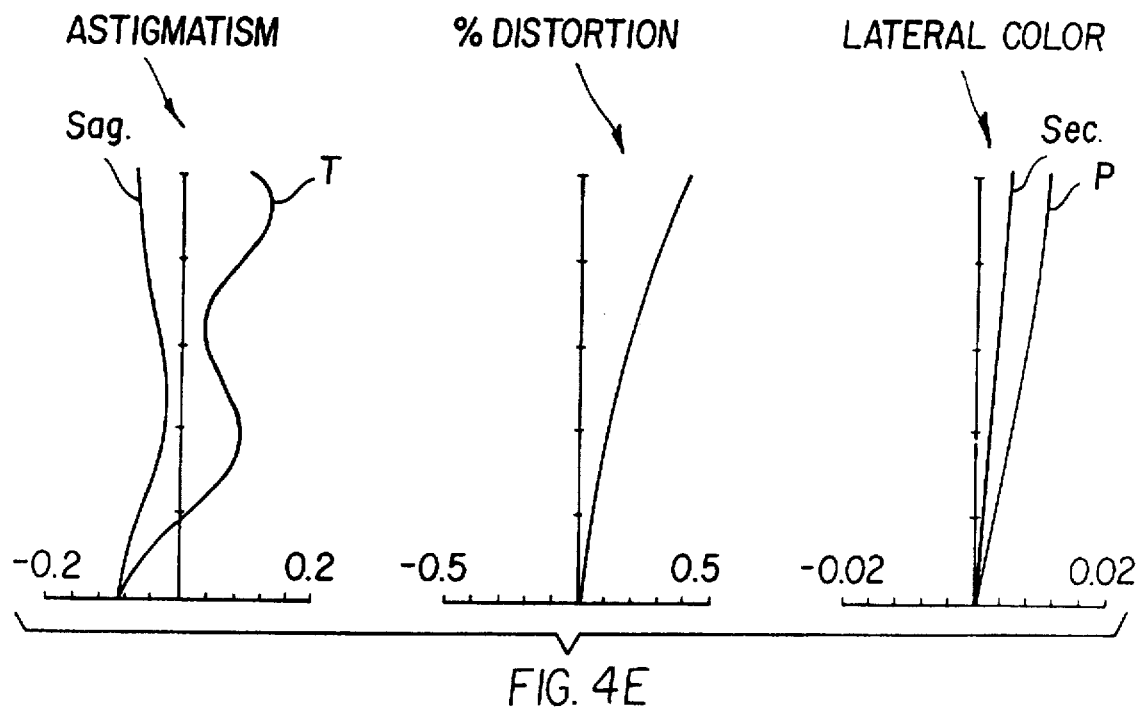
Figure 4F:
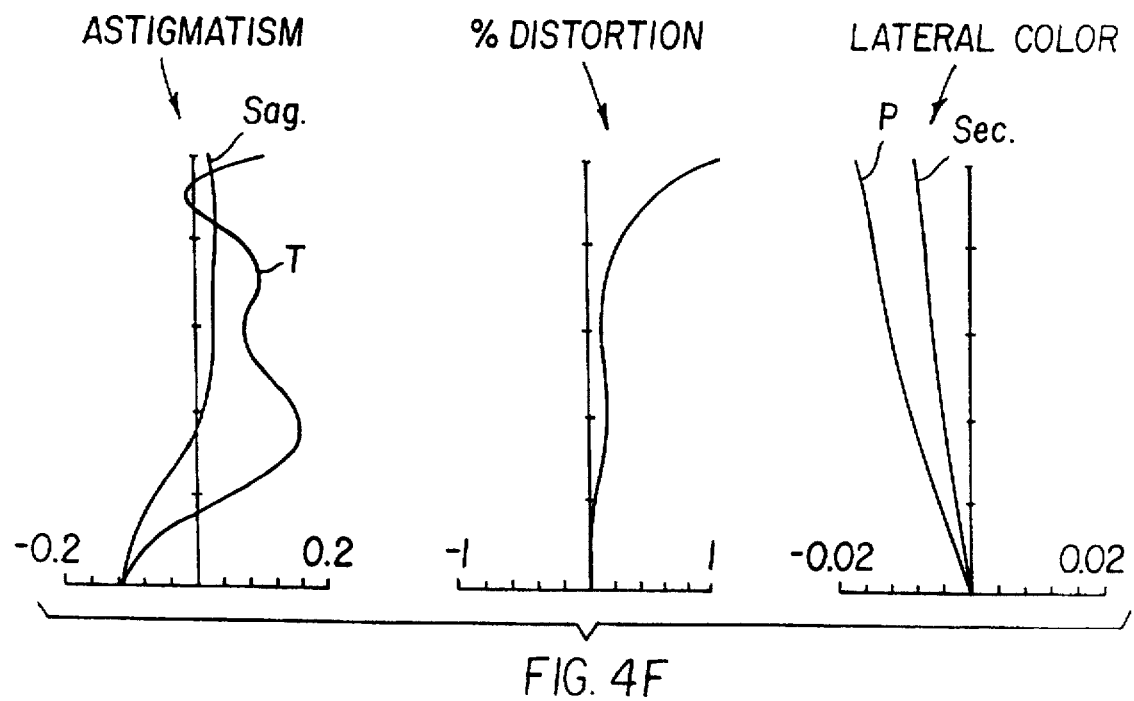
Figure 5A:
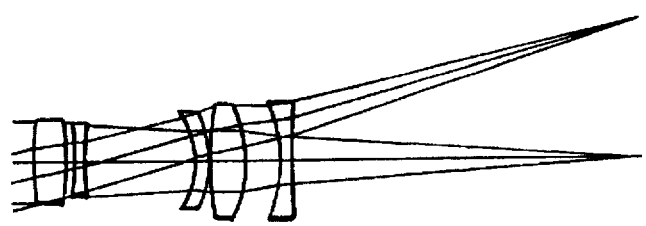
FIGS. 5A–5C are sectional views of a zoom lens 300 of a third illustrative embodiment.
Figure 5B:
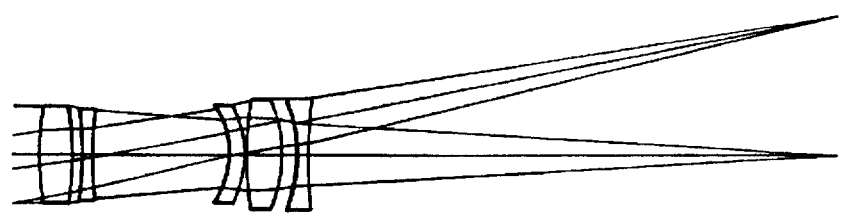
Figure 5C:
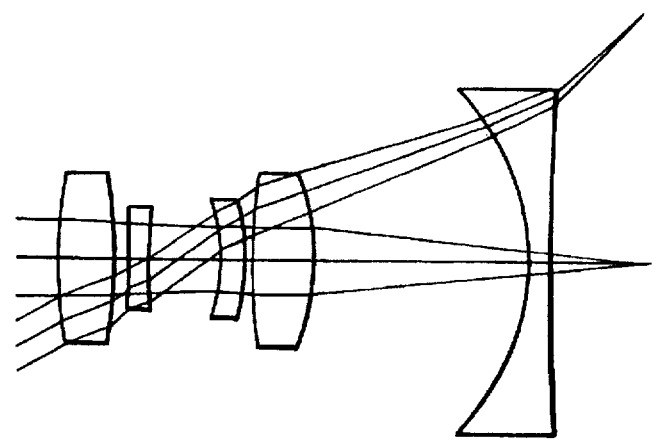

FIG. 4A provides ray intercept plots for lens 200 when it is operating in the telephoto position at 0, 0.7, and full field of view, respectfully. FIG. 4B provides ray intercept plots for the zoom lens 200 when it is operating in the middle position at 0, 0.7, and full field of view. FIG. 4C provides ray intercept plots for the zoom lens 200 when the lens system is operating at the wide-angle position. FIGS. 4D–4F represent Astigmatism, Distortion and Lateral color when the zoom lens is operating in the telephoto, middle and wide-angle position, respectfully.

Figure 6B:
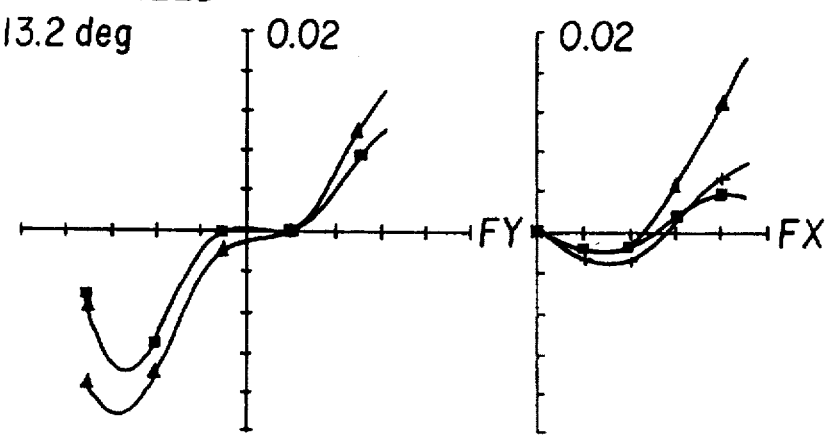
Figure 6B:
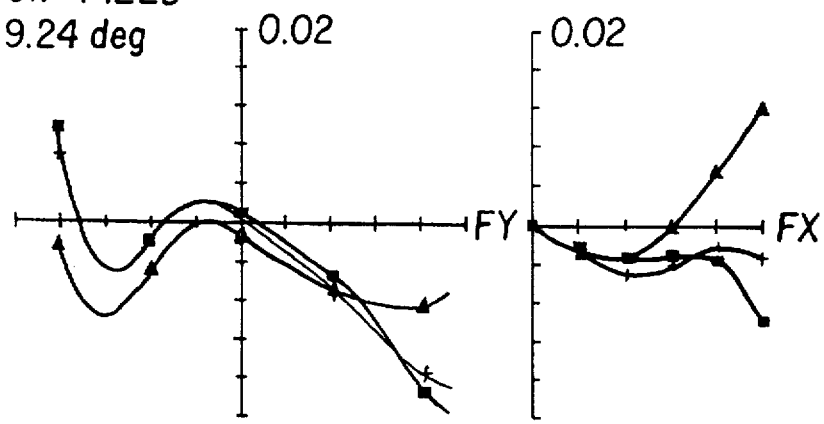
Figure 6B:
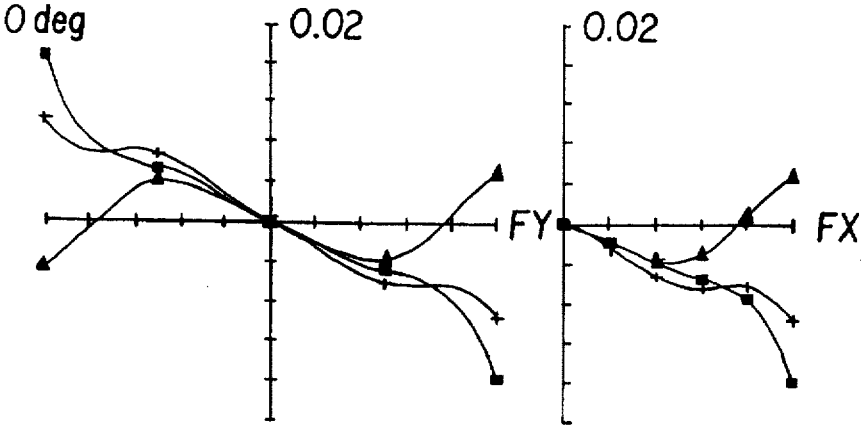
Figure 6C:
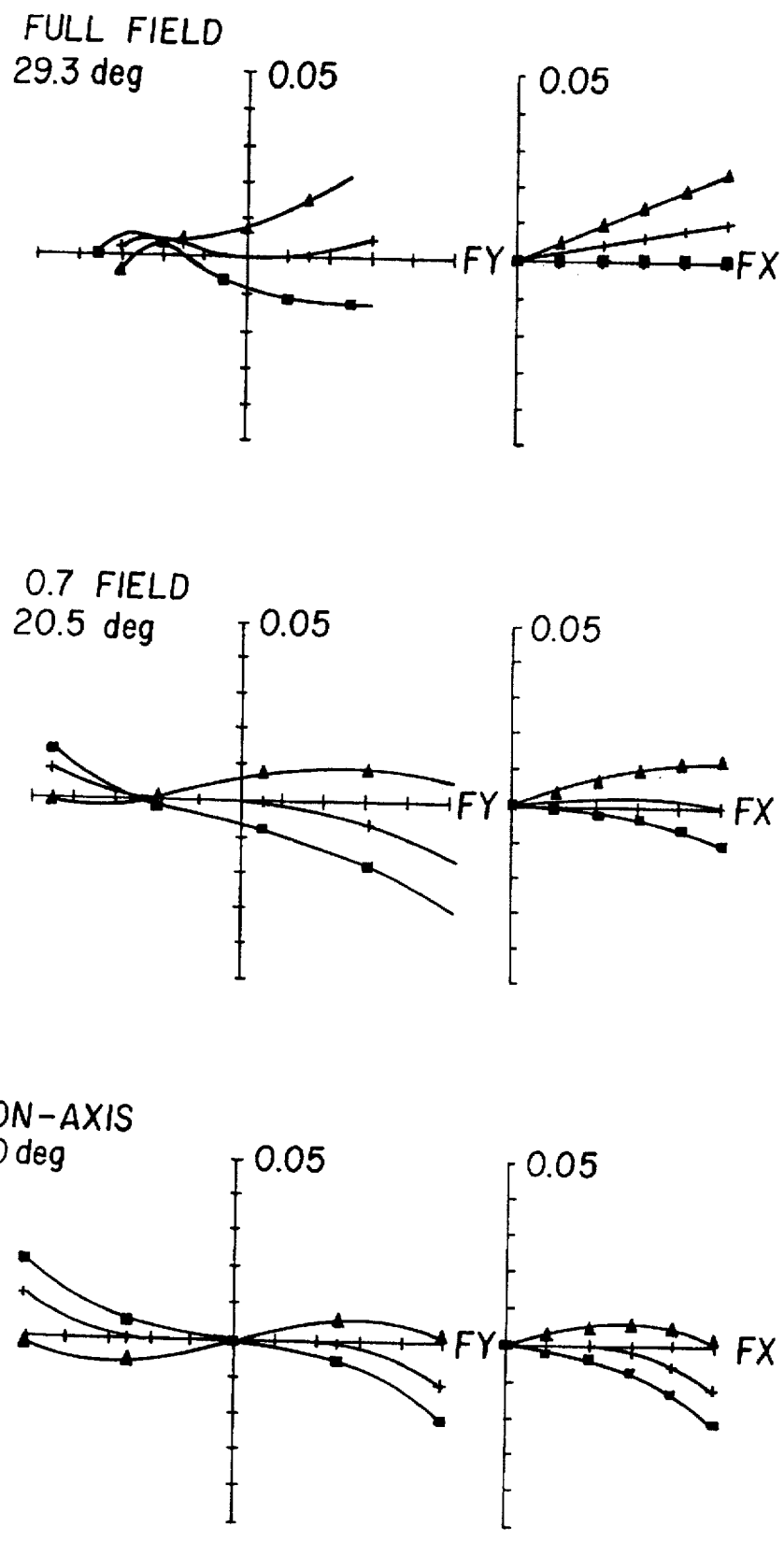
Figure 6D:
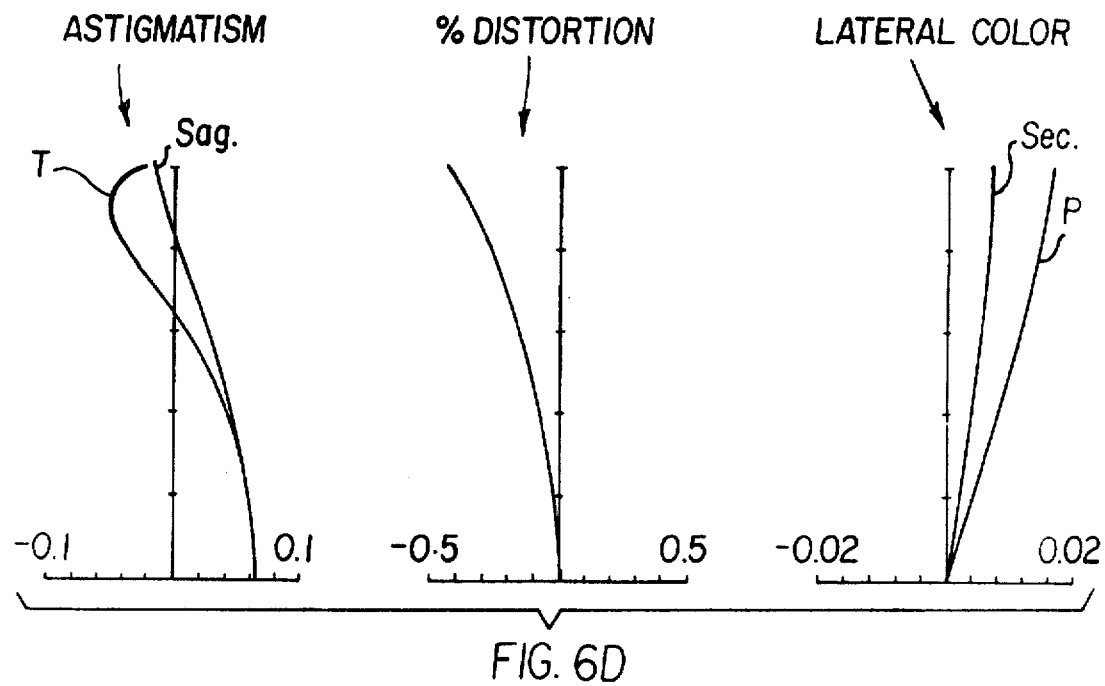
Figure 6E:
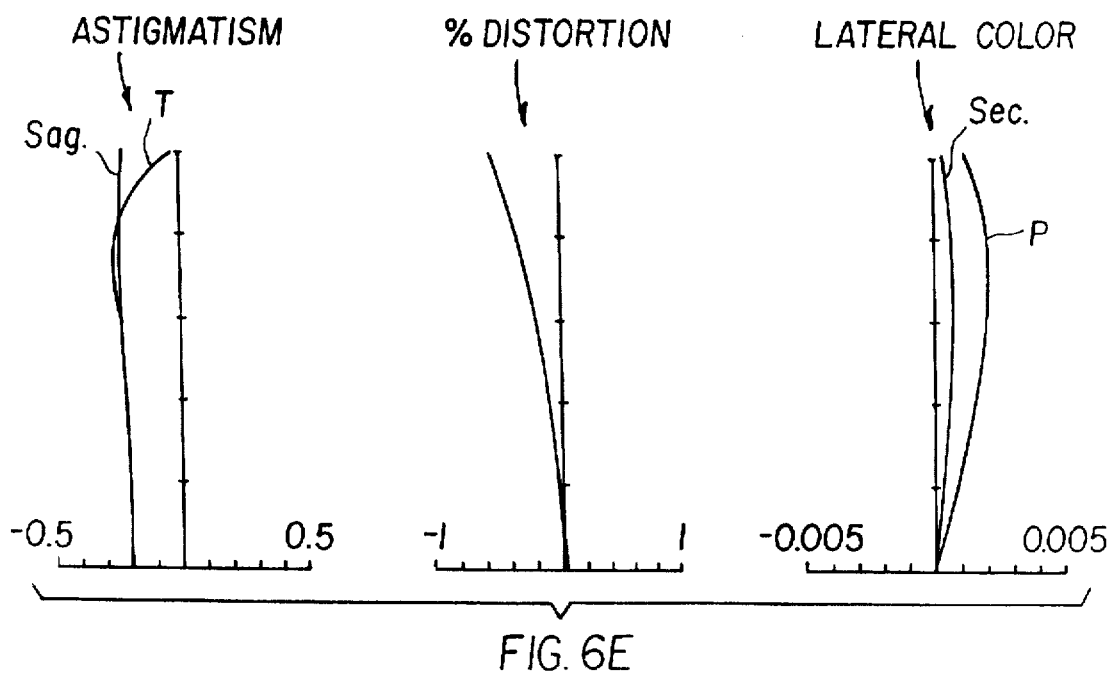
Figure 6F:
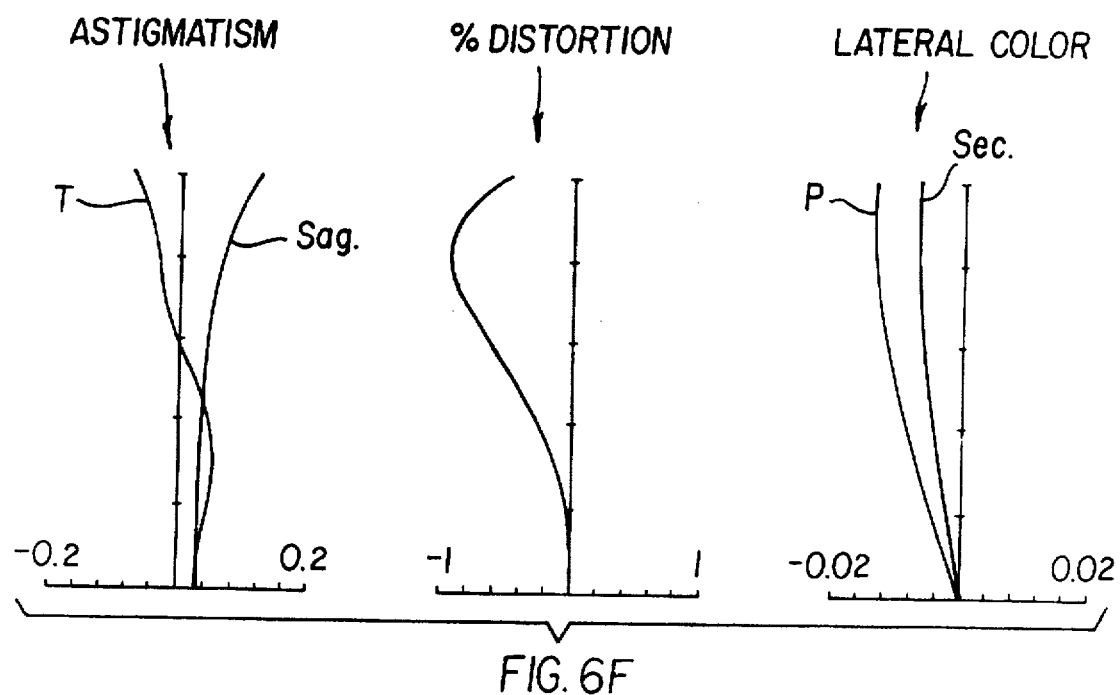

Similarly, FIG. 6A provides ray intercept plots for the zoom lens 300 when it is operating in the telephoto position at 0, 0.7, and full field of view, respectfully. FIG. 6B provides ray intercept plots for zoom lens 300 when it is operating in the middle position at 0, 0.7, and full field of view. FIG. 6C provides ray intercept plots for zoom lens 300 when the lens system is operating at the wide-angle position. FIGS. 6D–6F represent Astigmatism, Distortion and Lateral color when the lens system is operating in the telephoto, middle and wide-angle position, respectfully.

Note that the illustrative examples are corrected across a zoom ratio of approximately 3.3. The F-number ranges from F6 to F8.5.

EXAMPLE 1

TABLE 1A

| Surface | Radius | Distance (T or S) | Glass | $N_e$ | $v$ |
|---|---|---|---|---|---|
| *$R_1$ | 14.410 | 3.80 | SK16 | 1.623 | 60.56 |
| $R_2$ | −29.856 | 1.03 | LAF2 | 1.748 | 45.0 |
| $R_3$ | 25.5482 | 2.00 | AIR | | |
| Aperture Stop | | $S_2$ = Variable | AIR | | |
| $R_4$ | −9.006 | 1.362 | LAF2 | 1.748 | 45.0 |
| *$R_5$ | −14.182 | 0.20 | AIR | | |
| $R_6$ | 65.773 | 4.37 | SK5 | 1.591 | 61.5 |
| *$R_7$ | −10.764 | $S_4$ = Variable | AIR | | |
| *$R_8$ | −12.148 | 1.242 | PSK3 | 1.554 | 63.7 |
| $R_9$ | 250.000 | $S_5$ = Variable | AIR | | |
| | Infinity | | AIR | | |
| | Image Plane | | | | |

*Asphere

TABLE 1B

| Aspheric Coefficients | Surface | | | |
|---|---|---|---|---|
| | $R_1$ | $R_5$ | R7 | R8 |
| AD | 0.23075e−05 | 0.45598e−04 | 0.80663e−04 | 0.0 |
| AE | 0.12933e−06 | −0.44460e−06 | 0.10308e−05 | 0.3522e−06 |
| AF | −0.21329e−08 | 0.12017e−07 | −0.65724e−08 | −0.36546e−08 |
| AG | 0.21798e−10 | −0.15272e−09 | 0.92429e−10 | −0.41734e−10 |
| AH | 0.0 | 0.0 | 0.0 | 0.13967e−11 |
| AI | 0.0 | 0.0 | 0.0 | −0.17409e−13 |
| AJ | 0.0 | 0.0 | 0.0 | 0.79515e−16 |
| AK | 0.0 | 0.0 | 0.0 | −0.36689e−20 |
| K | 0.0 | 0.0 | 0.0 | −1.54974 | where K is a conic constant.

| Wavelengths (μm) | | |
|---|---|---|
| $\lambda_1$ | $\lambda_2$ | $\lambda_3$ |
| 0.5461 | 0.4861 | 0.6563 |

TABLE 1C

Zoom Spacing Data

| Zoom Position # | $S_2$ | $S_4$ | $S_5$ | EFL | f# |
|---|---|---|---|---|---|
| 1 (W) | 2.800 | 13.231 | 6.217 | 29.0 | 6.0 |
| 2 (M) | 12.789 | 4.098 | 36.503 | 69.5 | 7.5 |
| 3 (T) | 16.328 | 1.861 | 54.7211 | 96.5 | 8.5 |

EXAMPLE 2

TABLE 2A

| Surface | Radius | Distance (T or S) | Glass | $N_e$ | ν |
|---|---|---|---|---|---|
| *$R_1$ | 14.338 | 3.20 | SK16 | 1.623 | 60.56 |
| $R_2$ | −20.287 | 1.03 | LAFN21 | 1.792 | 47.7 |
| $R_3$ | 31.066 | 2.45 | AIR | | |
| Aperture Stop | | $S_2$ = Variable | AIR | | |
| $R_4$ | −7.303 | 1.50 | STYR. | 1.569 | 36.1 |
| *$R_5$ | −10.175 | 0.19 | AIR | | |
| $R_6$ | 33.384 | 5.01 | ZKN7 | 1.510 | 61.43 |
| *$R_7$ | −12.075 | $S_4$ = Variable | AIR | | |
| *$R_8$ | −12.186 | 1.242 | PSK3 | 1.554 | 63.7 |
| $R_9$ | 129.406 | $S_5$ = Variable | AIR | | |
| | Infinity | | AIR | | |
| | Image Plane | | | | |

*Asphere

TABLE 2B

| Aspheric Coefficients | Surface | | | |
|---|---|---|---|---|
| | $R_1$ | $R_5$ | R7 | R8 |
| AD | 1.5745e−05 | −8.6076e−05 | 0.000200 | 0. |
| AE | 6.0466e−07 | 4.7961e−06 | −4.8020e−06 | −1.3178e−06 |
| AF | −3.0485e−08 | −8.3786e−07 | 4.2657e−07 | 8.5244e−08 |
| AG | 1.0428e−09 | 5.7272e−08 | −1.6892e−08 | −2.373e−09 |
| AH | −1.1087e−11 | −2.2859e−9 | 3.5594e−10 | 3.3288e−11 |
| AI | −1.7958e−13 | 5.2964e−11 | −3.6112e−12 | −2.2401e−13 |
| AJ | 5.7380e−15 | −6.6299e−13 | 9.0546e−15 | 4.6121e−16 |
| AK | −4.2055e−17 | 3.4526e−15 | 6.626e−17 | 9.7368e−19 |
| K | 0.0 | 0.0 | 0.0 | −1.786022 | where K is a conic constant.

| Wavelengths (μm) | | |
|---|---|---|
| $\lambda_1$ | $\lambda_2$ | $\lambda_3$ |
| 0.5461 | 0.4861 | 0.6563 |

TABLE 2C

Zoom Spacing Data

| Zoom Position # | $S_2$ | $S_4$ | $S_5$ | EFL | f# |
|---|---|---|---|---|---|
| 1 (W) | 2.600 | 12.630 | 6.138 | 29.0 | 6.0 |
| 2 (M) | 9.742 | 3.854 | 37.637 | 69.5 | 7.5 |
| 3 (T) | 11.926 | 1.864 | 57.465 | 96.5 | 8.5 |

EXAMPLE 3

TABLE 3A

| Surface | Radius | Distance (T or S) | Glass | $N_e$ | ν |
|---|---|---|---|---|---|
| *$R_1$ | 23.924 | 3.80 | SK16 | 1.623 | 60.6 |
| $R_2$ | −28.636 | 0.88 | AIR | | |
| *$R_3$ | −36.907 | 1.24 | BASF51 | 1.728 | 38.3 |
| $R_4$ | 39.334 | 2.12 | AIR | | |
| Aperture Stop | | Variable | AIR | | |
| $R_5$ | −9.1672 | 1.52 | LAF2 | 1.748 | 45.0 |
| *$R_6$ | −14.3339 | 0.42 | AIR | | |
| $R_7$ | 43.866 | 4.14 | SK5 | 1.591 | 61.5 |
| *$R_8$ | −11.895 | Variable | AIR | | |
| *$R_9$ | −12.865 | 1.20 | PSK3 | 1.554 | 63.7 |
| $R_{10}$ | 211.548 | Variable | AIR | | |
| | Image Plane | | | | |

*Asphere

TABLE 3B

| Aspheric Coefficients | Surface | | | | |
|---|---|---|---|---|---|
| | $R_1$ | R3 | $R_5$ | R7 | R8 |
| AD | −8.877e−5 | 0.000127 | 1.353e−5 | 0.000101 | −2.215e−5 |
| AE | −1.486e−6 | 1.474e−6 | −2.945e−7 | 5.891e−7 | 2.462e−7 |
| AF | 1.131e−8 | −1.943e−8 | −1.073e−8 | 5.875e−9 | 2.645e−9 |
| AG | −3.532e−12 | 1.691e−10 | 7.895e−11 | −5.320e−11 | −1.305e−10 |
| AH | −5.180e−12 | 4.410e−12 | 0.0 | 0.0 | 1.132e−12 |
| AI | 6.180e−14 | −7.593e−14 | 0.0 | 0.0 | 4.620e−16 |
| AJ | 0.0 | 0.0 | 0.0 | 0.0 | −5.637e−17 |
| AK | 0.0 | 0.0 | 0.0 | 0.0 | 2.221e−19 |
| K | 0.0 | 0.0 | 0.0 | 0.0 | −2.0433 | where K is a conic constant.

| Wavelengths (μm) | | |
|---|---|---|
| $\lambda_1$ | $\lambda_2$ | $\lambda_3$ |
| 0.5461 | 0.4861 | 0.6563 |

TABLE 3C

Zoom Spacing Data

| Zoom Position # | $S_2$ | $S_4$ | $S_5$ | EFL | f# |
|---|---|---|---|---|---|
| 1 (W) | 2.600 | 13.614 | 6.217 | 29.0 | 6.0 |
| 2 (M) | 10.518 | 4.042 | 40.142 | 69.5 | 7.5 |
| 3 (T) | 13.366 | 1.864 | 60.731 | 96.5 | 8.5 |

The invention has been described in detail with particular reference to a preferred embodiment thereof, but it will be understood that variations and modifications can be effected within the spirit and scope of the invention.

What is claimed is:

1. A zoom lens for imaging an object onto an image plane, said zoom lens comprising: a plurality of lens elements centered on an optical axis and arranged into only three lens units, said lens units being in order from an object side;

a first, positive power lens unit having object side positive power lens element and an image side negative power lens element, said first lens unit being movable toward and away from the image plane along the optical axis;

a middle, positive power lens unit located behind said first lens unit, said middle lens unit being movable along the optical axis in the same direction as the first lens unit and at a different rate than the first lens unit, so that an axial distance between said first lens unit and said middle lens unit changes during zooming;

a rear negative power lens unit located behind said middle, positive power lens unit, said rear lens unit being movable toward and away from the image plane along the optical axis at a different rate than said first lens unit so that an axial distance between said first and said rear lens unit changes during zooming and an axial distance between said middle lens unit and said rear lens unit also changes during zooming;

said zoom lens characterized in that an axial distance between said first and said rear lens units changes less than an axial distance between said first lens unit and said middle lens unit; and said middle lens unit is movable towards the object side at a relatively slower axial speed than that at which said first and rear units are moved, to provide for a zoom ratio greater than 3.

2. A zoom lens according to claim 1, wherein $0.10 < \Delta_{f\text{-}r}/\Delta_{f\text{-}m} < 0.30$, where $\Delta_{f\text{-}r}$ is an axial distance change between the first lens unit and the rear lens unit and $\Delta_{f\text{-}m}$ is an axial distance change between the first lens unit and the middle lens unit created by zooming from a wide angle mode to a telephoto mode.

3. A zoom lens according to claim 2, wherein $0.15 < \Delta_{f\text{-}r}/\Delta_{f\text{-}m} < 0.20$.

4. A zoom lens according to claim 1, also having an aperture stop which moves with the first lens unit.

5. A zoom lens according to claim 1, wherein said positive power lens element is cemented to said a negative power lens element.

6. A zoom lens according to claim 1, wherein said rear, negative power lens unit has a negative power lens element with a concave object side surface having a clear aperture, said concave object side surface being a strong aspheric surface such that the amount of asphericity is higher than 50,000 nm in a vicinity of the object side surface's clear aperture.

7. A zoom lens for imaging an object onto an image plane, said zoom lens comprising only 5 lens elements centered on an optical axis and arranged into only three lens units, said lens units being;

a first, positive power lens unit having an object side positive lens element cemented to a negative lens element and an aperture stop said first lens unit being movable toward and away from the image plane along the optical axis;

a middle, positive power lens unit located behind said first lens unit, said middle lens unit being movable in the same direction as the first lens unit so that an axial distance between said first lens unit and said second lens unit changes during zooming;

a rear, negative power lens unit located behind said middle lens unit, said rear lens unit being movable toward and away from the image plane along the optical axis at a different rate than said first lens unit so that an axial distance between said first and said rear lens unit changes during zooming and an axial distance between said middle lens unit and said rear lens unit also changes during zooming; wherein an axial distance between said first and said rear lens units changes less than an axial distance between said first lens unit and said middle lens unit; and said middle lens unit is movable towards the object side at a relatively slower speed than that at which said first and rear units are moved, to provide for a zoom ratio greater than 3.

8. A zoom lens for imaging an object onto an image plane, said zoom lens comprising 5 lens elements centered on an optical axis and arranged into only three lens units, said lens units being

- a first, positive power lens unit including an object side positive lens element cemented to a negative lens element and an aperture stop, said first lens unit being movable toward and away from the image plane along the optical axis;
- a middle, positive power lens unit located behind said first lens unit, said middle lens unit being movable in the same direction as the first lens unit so that an axial distance between said first lens unit and said second lens unit changes during zooming, said middle lens unit including two lens elements, one of which has positive power;
- a rear, negative power lens unit located behind said middle lens unit, said rear lens unit being movable toward and away from the image plane along the optical axis at a different rate than said first lens unit so that an axial distance between said first and said rear lens unit changes during zooming and an axial distance between said middle lens unit and said rear lens unit also changes during zooming, said rear, negative power lens unit being a negative power lens element with a concave object side surface having a clear aperture; wherein an axial distance between said first and said rear lens units changes less an axial distance between said first lens unit and said middle lens unit; and said middle lens unit is movable towards the object side at a relatively slower speed than that at which said first and rear units are moved, to provide for a zoom ratio greater than 3.

9. A zoom lens according to claim 8, wherein said concave object side surface is aspheric the amount of asphericity is higher than 50000 nm in a vicinity of the object side surface's clear aperture.

* * * * *